United States Patent Office 2,976,323
Patented Mar. 21, 1961

2,976,323
PROCESS FOR THE PREPARATION OF ALKYL MONOSULFIDES

Hillis O. Folkins, Crystal Lake, and Elmer L. Miller, Cary, Ill., assignors to The Pure Oil Company, Chicago, Ill., a corporation of Ohio No Drawing. Filed Aug. 2, 1955, Ser. No. 526,053

3 Claims. (Cl. 260—609)

This invention relates to the synthesis of thioethers. It is more directly concerned with catalyst compositions employed in promoting the efficiency of the reaction between low molecular weight alcohols and hydrogen sulfide to produce low molecular weight aliphatic monosulfides.

Because alkyl monosulfides show a marked tendency to form addition products with a wide variety of chemicals, e.g., mercuric salts, halogens, alkyl halides and others, they are important as chemical intermediates. For example, dimethyl sulfide is used in the production of dimethyl sulfoxide, an important chemical for use as a solvent, anti-freeze, etc. In addition, the lower molecular weight thioethers exhibit solvency action for a variety of organic substances alone or in combination with other organic materials, such as low molecular weight aliphatic monohydric alcohols.

It is known that thioethers can be prepared by means of a plurality of syntheses. Perhaps the best known from a commercial standpoint involves the formation of monosulfides from organic halides and sodium mercaptides in a reaction related to the Williamson synthesis. In carrying out this type of reaction, it has also been found possible to employ sodium ethoxide with the mercaptan and halogen derivative. Other reactions which are disclosed in the literature involve the reacting of sulfur and a normally gaseous monoolefin under suitable reaction conditions. Also, sulfides may be formed by the action of some mercaptans with an alcohol. However, this reaction is not flexible because in certain instances the reactants involved react to form the oxyether. For example, benzyl mercaptan and ethyl alcohol react to form an oxyether. While excellent yields may be obtained from the reaction between an alkyl halide and a sodium mercaptide, the reactants involved in this type of reaction are not always readily available under favorable economic conditions to permit large scale production. While the latter two reactions employ substances which can be economically and conveniently obtained or produced from various by-products from industries such as the petroleum industry, the low yields or unpredictability of these reactions make them unsatisfactory from an economical and commercial standpoint. However, it has been found, according to this invention, that excellent yields of low molecular weight thioethers may be produced by reacting a low molecular weight aliphatic monohydric alcohol and hydrogen sulfide, both of which are low-priced products which may be conveniently obtained in commercial quantities.

It is, therefore, an object of this invention to provide an economical and practical process for the preparation of alkyl monosulfide from aliphatic, monohydric alcohols and hydrogen sulfide. It is a further object of this invention to provide a catalyst composition which may be employed effectively in increasing the production of alkyl monosulfide from an aliphatic, monohydric alcohol and hydrogen sulfide. These and other objects will become more apparent from the following detailed description of the instant invention.

One of the classic reactions for the production of thiols involves the reaction:

(1) $\quad ROH + H_2S \rightarrow RSH + H_2O$

In carrying out this reaction, an alkyl monosulfide is produced as a by-product by the competing reaction:

(2) $\quad 2ROH + H_2S \rightarrow R_2S + 2H_2O$ or by the condensation of at least part of the thiols produced in the first reaction:

(3) $\quad 2RSH \rightarrow R_2S + H_2S$

The subject invention is primarily concerned with the production of alkyl monosulfides which presumably occurs principally by reaction 2 accompanied by reaction 3 in varying degree. However, the selection of a catalyst for effecting this objective cannot be made on the basis of experience with catalyst compositions developed for the production of thiols in accordance with the foregoing reaction. For example, some catalyst compositions which have been employed in promoting this reaction to produce substantial amounts of thiols do not exhibit a sensitivity to mole ratio of reactants. Regardless of whether a low or high ratio of hydrogen sulfide to alcohol is employed, the selectivity of these catalysts toward the production of alkyl monosulfides remains low and substantially unvarying.

According to this invention, it has been found that by reacting a low molecular weight aliphatic alcohol with hydrogen sulfide under suitable reaction conditions in the presence of a catalyst selected from the group consisting of silica gel and a silica-containing catalyst having acidic characteristics, almost quantitative selectivity for monosulfide formation can be obtained. By carrying out the invention under controlled operating conditions, alkyl monosulfides can be produced as the principal products from the reaction between a low molecular weight, saturated aliphatic monohydric alcohol and hydrogen sulfide.

In carrying out the reaction, temperatures in the range of 600–950° F. may be employed. In the event that higher molecular weight alcohols are employed, the operating temperatures are lowered. Preferred temperatures for reacting methanol and hydrogen sulfide are in the range of 700–850° F. Pressures may vary widely, but are in the range of atmospheric to 200 p.s.i.g. Since increase in pressure tends to favor sulfide formation over that of thiols, it is generally preferable to operate at pressures greater than atmospheric. Preferred ranges are from about 50–200 p.s.i.g. Preferred mole ratios of hydrogen sulfide/alcohol are in the range of 0.2–0.7, although mole ratios outside this range may be employed. However, ratios of reactants in excess of the preferred range have a deleterious effect on the selectivity of the catalyst for producing the alkyl sulfide.

To illustrate the subject invention, comparative data was obtained by reacting methanol with hydrogen sulfide in the presence of an alumina catalyst and a silica-alumina catalyst. In carrying out these reactions, the following operating conditions were employed:

Temperature, ° F. _____ 752
Pressure _____ Atmospheric
LVHSV [1] _____ 0.39
Charge:
    MeOH _____gms./hr__ 9.1
    $H_2S$ _____gms./hr__ 19.3
Mole ratio: $H_2S$:MeOH _____ 2.0

[1] Liquid volume hourly space velocity = liquid volume at 60° F. of the limiting reactant fed per hour per unit volume of effective reactor space or catalyst bed.

Table I

| Catalyst | Yield, Mole Percent of Alcohol R₂S | Selectivity, Percent R₂S |
| --- | --- | --- |
| SiO₂—Al₂O₃ (13 wt. percent) | 33.1 | 73.6 |
| Silica gel | 23.0 | 86.8 |
| Silica-magnesia (25%) | 15.8 | 80.5 |
| Al₂O₃—5% silica | 21.7 | 37.2 |
| Al₂O₃ (Alorco F-10) [1] | 21.6 | 31.1 |

[1] A proprietary activated alumina obtained from the Aluminum Co. of America.

From the data in Table I, it is seen that the silica-containing catalysts of this invention manifest excellent selectivity with respect to thioether production, even at relatively high mole ratios of hydrogen sulfide, e.g., 2.0. It has been found that the reactant ratio has a distinct effect upon selectivity for sulfide formation. Accordingly, in carrying out the subject reaction in the presence of the catalysts of this invention at a reactant ratio of about 0.6, within the preferred range, at properly selected operating conditions and pressure, as above noted, increased conversion and almost quantitative selectivity for sulfide formation will be obtained.

As it has been pointed out above, the catalysts of this invention are specific in that they are receptive to changes in reactant ratio, whereas many other catalysts of this nature are not. Reference to Table II shows results obtained over a potassium carbonate-alumina catalyst where substantially no change in selectivity of reaction occurred regardless of the mole ratio of reactants employed.

Table II

Conditions: Atmospheric pressure; 752° F.; total gaseous space velocity (STP)=200]

| Catalyst | Mol Ratio, H₂S/CH₃OH | Methyl Sulfide | |
| --- | --- | --- | --- |
| | | Yield (Mol Percent) | Selectivity, Percent |
| Al₂O₃—K₂CO₃ (5.3 wt. percent) | 2.00 | 3.3 | 3.9 |
| | 1.54 | 4.3 | 5.4 |
| | 1.19 | 3.5 | 4.8 |
| | 0.89 | 3.3 | 5.0 |

Similar results are obtained over a catalyst composed of 10% magnesium oxide deposited on pumice. At a H₂S/CH₃OH ratio of 2.0 a sulfide yield of 15 mole percent is obtained at a selectivity for sulfide formation of 30%. At a H₂S/CH₃OH ratio of around 0.6, a slightly lower yield (12 mole percent) is obtained but selectivity remains constant at about 30%.

The catalysts which may be employed in carrying out this invention are silica gel and high surface-area silica-containing catalysts which show acidic reaction characteristics. Especially useful are those silica-containing catalysts which find extensive use in petroleum cracking processes and allied reactions. Examples of these catalysts are silica-alumina, silica-magnesia, silica-alumina-zirconia, and silica in combination with titania or zirconia, as well as other related silica-containing catalysts, for instance, acid-treated clays. In general, silica gel and silica-containing compositions in which exist a cation defect, and which thus tend to acid-catalyze many reactions, are effective.

Preparation methods for these catalysts are well-known and are discussed in the literature. A common method is outlined for the preparation of silica-alumina catalysts in Industrial and Engineering Chemistry, 44, 2860 (1952), wherein a silica hydrogel is formed by the action of sulfuric acid on water-glass, followed by incorporation of the alumina by precipitation of an aluminum salt with a base. Other references for methods of preparation of these catalysts may be found in Catalysis II, Emmett, page 5 (Reinhold Publishing Corporation, 1955).

The amount of silica to be incorporated into these catalyst compositions may vary widely. Thus, a gamma-alumina containing as little as 5% silica will give improved selectivity for sulfide formation over that obtained by alumina alone. Silica gel in itself is a selective catalyst but yields are lower than those obtained with catalysts of preferred concentrations of silica. Hence, more severe reaction conditions can be employed to increase the yield. Preferred compositions are those in which the silica content is in the range of 50–95 weight percent of the total catalyst composition.

In the practice of this invention, there can be used any low molecular weight aliphatic monohydric alcohol having 1 to 8 carbon atoms per molecule. Although reactant alcohols usually will be charged separately, mixtures of alcohols may be employed. In such cases, a mixture of sulfides will be produced, their respective amounts corresponding in general to the relative reactivities of the alcohols. In general, symmetrical sulfides corresponding to the respective alcohols will be formed along with varying amounts of unsymmetrical sulfides, providing the reactivities of the charged alcohols are not greatly different. Thus, a mixture of charged methyl and ethyl alcohol will yield principally methyl and ethyl sulfides with varying amounts of methyl ethyl sulfide. Although excellent feed conversions and selectivities can be obtained by controlling the reactant ratios employing the catalysts of this invention, increased efficiency may be obtained by recycle operations wherein unreacted products contained in the reaction effluent are returned to the reaction zone for further processing. Accordingly, by employing a proper recycle system, alkyl monosulfide yields approaching 100% may be obtained.

The purification process employed in recovery of the thioethers prepared according to this invention will depend upon the volatility characteristics of the end-product. Generally, however, conventional fractional condensation and distillation processes may be employed, as well as suitably designed absorption processes.

Accordingly, we claim our invention:

1. A process for the preparation of low molecular weight alkyl monosulfides which comprises reacting a $C_1$–$C_8$ aliphatic monohydric alcohol with hydrogen sulfide at a temperature within the range of about 600°–950° F., a pressure within the range of about atmospheric–200 p.s.i.g. in the presence of a catalyst consisting essentially of silica gel.

2. A process for the preparation of low molecular weight alkyl monosulfides which comprises reacting a $C_1$–$C_8$ aliphatic monohydric alcohol with hydrogen sulfide, in a mol ratio of H₂S/alcohol of about 0.2–0.7, at a temperature of about 600°–950° F. and a pressure of about atmospheric to 200 p.s.i.g. in the presence of a catalyst consisting essentially of silica gel.

3. A process for the preparation of dimethyl sulfide which comprises reacting hydrogen sulfide and methanol, in a mole ratio of 0.2 to 0.7, in the presence of a catalyst consisting essentially of silica gel, at a temperature of about 600°–950° F. and a pressure within the range of about atmospheric–200 p.s.i.g.

References Cited in the file of this patent

UNITED STATES PATENTS

| | | |
| --- | --- | --- |
| 2,592,646 | Bell | Apr. 15, 1952 |
| 2,667,515 | Beach | Jan. 26, 1954 |
| 2,816,146 | Doumani | Dec. 10, 1957 |

UNITED STATES PATENT OFFICE
CERTIFICATION OF CORRECTION

Patent No. 2,976,323            March 21, 1961

Hillis O. Folkins et al.

It is hereby certified that error appears in the above numbered patent requiring correction and that the said Letters Patent should read as corrected below.

Column 4, lines 48 and 55, for "aliphatic" read -- alkyl --.

Signed and sealed this 15th day of August 1961.

(SEAL)
Attest:

ERNEST W. SWIDER
Attesting Officer

DAVID L. LADD
Commissioner of Patents